United States Patent Office 3,849,382
Patented Nov. 19, 1974

3,849,382
POLYESTERS FROM 2,6 - NAPHTHALENEDICAR-
BOXYLIC ACID AND TRIS(2-HYDROXYETHYL)
ISOCYANURATE
Yasukuni Nakatsuji, Tamaki Kanai, Hiroshi Noda, and Sadayoshi Miura, Sagamihara, and Hideaki Suzuki, Tokyo, Japan, assignors to Teijin Limited, Osaka, Japan
No Drawing. Filed Jan. 16, 1973, Ser. No. 324,085
Int. Cl. C08g 17/08
U.S. Cl. 260—75 N  4 Claims

ABSTRACT OF THE DISCLOSURE

A polyester composition having outstandingly improved properties for forming electric insulating coatings, the composition comprising units derived from (A) an aromatic 2,6-naphthalenedicarboxylic acid component and 0–10 mol percent, based on said component, of another dicarboxylic acid or a derivative thereof and (B) an alcohol component consisting of tris(2-hydroxyethyl)isocyanurate and another di- or tri-hydric alcohol. The latter polyhydric alcohol being contained in an amount of 0–60 mol percent of the total of said isocyanurate and the other polyhydric alcohol; with the proviso that said component (A) accounts for 40–50 equivalent percent of the whole composition.

---

This invention relates to a coating-forming polyester composition that demonstrates outstandingly improved properties for forming electric insulating coatings, such as for the formation of insulation for electric wires, in that it conjointly possesses in particular such improved properties as heat-shock resistance, resistance to heat-softening and after-heating windability.

In concomitance with the development of electrical appliances there has arisen a demand for overcoming the degradation at elevated temperatures of the resins used for forming electric insulating coatings. In consequence, the polyester resins or modified polyester resins, which excel in such properties as thermal resistance and mechanical strength are attracting attention. The present invention concerns a coating-forming polyester composition that demonstrates outstandingly improved properties for this purpose.

More specifically, the invention relates to a coating-forming polyester composition comprising units derived from (A) an aromatic 2,6-naphthalenedicarboxylic acid component consisting of a member selected from the group consisting of 2,6-naphthalenedicarboxylic acid and the lower alkyl esters and halides thereof and 0–10 mol percent based on said member, of other dicarboxylic acids or derivatives thereof selected from the group consisting of the aromatic dibasic acids other than 2,6-naphthalenedicarboxylic acid, the lower alkyl esters and halides of said aromatic dibasic acids, and the aliphatic dibasic acids and the lower alkyl esters and halides thereof; and (B) an alcohol component consisting of tris(2-hydroxyethyl)isocyanurate and other di- or trihydric alcohols, the latter polyhydric alcohols being contained in an amount of 0–60 mol percent of the total of said isocyanurate and other polyhydric alcohol; with the provision that the foregoing aromatic 2,6-naphthalenedicarboxylic acid component (A) accounts for 40–50 equivalent percent of the whole composition.

A number of polyester compositions are known in which tris(2-hydroxyethyl)isocyanurate (for brevity to be hereinafter referred to, at times, as THEIC) has been used for a part of all of the alcohol component. For instance, in German Pat. No. 1,251,528 (published Oct. 5, 1967) there is a disclosure concerning a process for the preparation of polyesters including a polyester derived from THEIC and 1,4-naphthalenedicarboxylic acid. However, there is no mention at all in this patent of a polyester derived from THEIC and 2,6-naphthalenedicarboxylic acid. Neither is there any mention of the resulting polyester being used for forming an electric insulating coating. On the other hand, in U.S. Pat. 3,342,780 (patented Sept. 19, 1967) there is disclosed a reaction product of a dibasic polycarboxylic acid and THEIC, which is used for forming electric insulating coatings. While in this patent there is mentioned the use of terephthalic or isophthalic acid and the acyl halides or lower dialkyl esters thereof as the dibasic polycarboxylic acid, no mention is made at all of the use of naphthalene-dicarboxylic acids and the acyl halides or lower dialkyl-esters thereof. Further, in U.S. Pat. 3,374,114 (patented Mar. 19, 1968) there is disclosed the utilization as a resin for forming insulating coatings of a polyester derived from the straight, branched or cyclic glycols and 2,6-, 2,7- and/or 1,5-naphthalenedicarboxylic acid in which a member selected from the group consisting of terephthalic or isophthalic acid and the lower alkyl esters thereof may be contained in an amount as high as 70 mol percent. This patent however makes no mention at all of the use of the THEIC component.

We found that a coating-forming polyester composition not mentioned in any of the foregoing proposals could be provided by carrying out the esterification or trans-esterification reaction of 40–50 equivalent percent of the aforesaid aromatic 2,6-naphthalenedicarboxylic acid component (A) and 60–50 equivalent percent of the alcohol component (B) at 150–300° C. in the presence of an esterification or transesterification catalyst, and that the so obtained composition conjointly possessed in an outstandingly improved state the various properties required for forming an electric insulating coating.

It is therefore an object of the present invention to provide a coating-forming polyester composition which demonstrates outstandingly improved properties for forming electric insulating coatings as compared with the conventional proposals, and to a process for preparing such a composition.

Other objects and advantages of the present invention will become apparent from the following description.

In accordance with the present invention, 40–50 equivalent percent of an aromatic 2,6-naphthalenedicarboxylic acid component (A) consisting of a member selected from the group consisting of 2,6-naphthalenedicarboxylic acid and the lower alkyl esters, preferably the $C_1$–$C_4$ alkyl esters, and the halides thereof, and 0–10 mol percent, preferably 0–5 mol percent, based on the foregoing member, of other dicarboxylic acids or derivatives thereof selected from the group consisting of the aromatic dibasic acids other than 2,6-naphthalenedicarboxylic acid, the lower alkyl esters and halides of said aromatic dibasic acids, and the aliphatic dibasic acids and the lower alkyl esters and halides thereof; and 60–50 equivalent percent of an alcohol component (B) consisting of tris(2-hydroxyethyl)isocyanurate and other di- or trihydric alphatic alcohols, wherein the latter polyhydric alcohols are contained in an amount of 0–60 mol percent, based on the total of said isocyanurate and other polyhydric alcohols, are submitted to an esterification or transesterification reaction at 150–300° C. in the presence of an esterification or transesterification catalyst.

As the other dicarboxylic acids or derivatives thereof that the aromatic 2,6-naphthalenedicarboxylic acid component (A) may contain, included are such, for example, as the aliphatic dibasic acids and the lower alkyl esters or halides of said dibasic acids selected from the group consisting of adipic acid, succinic acid, maleic acid and sebacic acid, the $C_1$–$C_4$ alkyl esters of said acids and the halides, preferably the chlorides and bromides of said acids, which may be used either singly or in combination of two or more thereof. Preferred however is the use of the aromatic dibasic acids and the lower alkyl esters or halides of said dibasic acids selected from the group consisting of the naphthalenedicarboxylic acids other than 2,6-naphthalenedicarboxylic acid, the other isomers, terephthalic acid and isophthalic acid, and the $C_1$–$C_4$ alkyl esters of said acids and the halides, preferably the chlorides and bromides, of said acids, which may be used either singly or in combinations of two or more thereof.

Of these other dicarboxylic acids or derivatives thereof, preferred are the dibasic acids or their lower alkyl esters.

As the other di- or trihydric aliphatic alcohol that may be contained in the alcohol component (B) in addition to the tris(2-hydroxyethyl)isocyanurate, mention can be made of a member selected from the group consisting of ethylene glycol, propylene glycol, butanediol, pentanediol, glycerin, pentaerythritol and trimethylolpropane. Of these, preferred are the dihydric aliphatic alcohols, ethylene glycol and propylene glycol being especially preferred.

In the invention process the aromatic 2,6-naphthalenedicarboxylic acid component (A) is used in an amount of 40–50 equivalent percent to the 60–50 equivalent percent of the alcohol component (B) consisting of THEIC or THEIC containing other polyhydric alcohols. When the acid component (A) is less than 40 equivalent percent, the thermal resistance and mechanical properties of the polyester composition decline. On the other hand, when the amount of the acid component (A) exceeds 50 equivalent percent, this also is objectionable, since the mechanical properties of the polyester composition suffer.

Further, when the other dicarboxylic acids or derivatives thereof, which may be contained in an amount of 0–10 mol percent, preferably 0–5 mol percent, based on the member selected from the group consisting of 2,6-naphthalenedicarboxylic acid, and the lower alkyl esters and halides thereof, exceed 10 mol percent, the thermal resistance of the polyester coating obtained by curing becomes poor.

Further, when the amount of the other di- or trihydric aliphatic alcohols which may be contained in an amount of 0–60 mol percent based on the total of THEIC and the other polyhydric alcohol, exceeds 60 mol percent, not only does the thermal resistance of the coating decline but also turbidity is set up in the composition when it is made into a varnish resulting in loss of stability.

The coating-forming polyester composition of this invention can be obtained by the conventional esterification or transesterification reaction, namely by reacting the aromatic 2,6-naphthalenedicarboxylic acid component (A) and the alcohol component (B) at a temperature of 150–300° C. in the presence of an esterification or transesterification catalyst. Known esterification or transesterification catalysts can be used, including metal oxides such as litharge, lead oxide and lithium oxide and metal salts such as lithium acetate and zinc acetate. While the amount of catalyst used can be suitably chosen in accordance with the class of the reactants, the class of catalyst, the molar ratio of the component (A) to component (B) and the reaction temperature, it is usually 0.1–0.5 percent by weight based on the total weight of the acid component charged. The reaction procedure is well known and is carried out in the following manner. The components (A) and (B) and catalyst are added in prescriptive amounts and, after the mixture is deaired, it is heated with stirring in a stream of an inert gas. First, water and alcohol are distilled off gradually at 200° C. and the temperature is raised to 230° C. by the time the water and alcohol removed amount to 85% of theory. The reaction is brought to conclusion finally at 250° C. before gelation takes place. The reaction is stopped by cooling or by the addition to the reaction system of a cresol-toluene type solution. The addition of the cresol-toluene type solution is to be especially preferred.

The coating-forming polyester composition of this invention can be used in the form of an insulating varnish in which have been incorporated a curing agent and an aromatic organic solvent which dissolves said polyester. In this case, it is possible to add such additives as a colorant such as a dye or a pigment such as $TiO_2$, a stabilizer such as hindered phenol type antioxidant and lauryl tin, extenders such as calcium carbonate and aluminum silicate, and inorganic fillers such as mica powder, talc and clays. As examples of the foregoing aromatic organic solvents, mention can be made of benzene, toluol, phenol, cresol and mineral spirit. The foregoing curing agents include tetraalkyl titanates, preferably the tetraalkyl titanates in which the alkyl group is of 1–5 carbon atoms, metal salts, preferably the Co and Zn salts, of naphthenic acid, and blocked isocyanates. These blocked isocyanates, mention can be made of those obtained by blocking with 3 mols of phenol an isocyanate type compound obtained from trimethylolpropane and 3 mols of toluene diisocyanate.

According to a preferred embodiment of the invention, the coating-forming polyester composition provided demonstrates exceptionally excellent performances in the physical properties hereinafter described, such as a resistance to heat-softening of above 470° C., a heat-shock resistance of above 200° C. and an after-heating windability of 1 time.

In the present invention the resistance to heat-softening, the heat-shock resistance, and the after-heating windability are physical properties, which are determined by the following tests.

(a) Resistance to heat-softening

To 1000 grams of a m-cresol solution of a polyester composition whose solids content is 50% by weight are added 820 grams of m-cresol and 180 grams of mineral spirit to prepare a varnish whose resinous solids content is 25% by weight, to which is added 20 grams of tetraisopropyl titanate as the curing agent to prepare the sample varnish.

The varnish is baked to a coating thickness of 40–60 microns onto one side of a rectangular copper plate having a length of 7.5 cm., a width of 6.0 cm. and thickness of 300 microns. This sample is placed on top of a load receiving block having an electrically conductive metallic plate surface in such a manner that the surface with the varnish baked on comes into contact with the surface of the load receiving block. A 5-kg. load is then placed atop the varnished copper plate, and an alternating current of 100 volts is applied across the load receiving block and the sample copper plate to raise the temperature of the surrounding atmosphere. As the temperature rises, the coating of the copperplate softens and shorting of the circuit takes place. The temperature (° C.) at which the short circuit takes place is used to indicate the resistance to heat-softening.

(b) Heat-shock resistance

The same varnish as that used in (a), above, is used.

A copper wire of 1-mm. diameter is applied and baked with this varnish for seven times under the conditions of a furnace temperature of 350° C. and a linear velocity of 8.0 meters per minute. Thus is prepared an enameled electric wire having a coating thickness of 35 microns. A core rod of the same diameter as the enameled wire is used, and coils are prepared by winding the wire about the core rod for 20 times. A total of 12 coils, three for each temperature at which measurement is to be made, are prepared. These coils are exposed for one hour at the several temperatures of 150°, 175°, 200° and 225° C. After exposure to the foregoing temperatures, the coils are examined for the presence of cracks, using a magnifying glass. Even the presence of a single crack disqualifies the coil. The maximum temperature (° C.) at which all coils were free of cracks is used to indicate the heat-shock resistance.

(c) After-heating windability

An enameled wire prepared as in (b) is exposed for 6 hours in a heated atmosphere of 250° C. Coils are then prepared from this wire by winding it 20 times about core rods having diameters 1, 2, 5 and 10 times the wire diameter. The presence of cracks is examined as in (b), and the smallest diameter at which the coils were free of cracks is used to indicate the after-heating windability. Thus, the smaller this value, the better is the wire with respect to its after-heating windability.

The following examples, along with control experiments, will be given to illustrate several modes of practicing the process of the present invention.

EXAMPLES 1–12 AND CONTROL 1–26

The dicarboxylic acid components (used in the form of dimethyl esters) and alcohol components indicated in the hereinafter given Tables 1 and 2 were used in the equivalent percent as indicated therein. These components were placed in a 500-cc. 4-necked flask equipped with a Widmer spiral, a thermometer, a nitrogen inlet line and a stirrer. There was also provided a receiver for determining the water content and a condenser at the top of the spiral. Next, 13 grams of mineral spirit, 7 grams of xylene and as catalyst 0.085 grams of litharge were added and, after deairing, the mixture was heated at 160–175° C. to distill off the methanol gradually. The water of the jacket was then removed and the temperature was raised and, after distilling off the mineral spirit, xylene and methanol at 200–210° C., the spiral was removed and the receiver for determining the water content was connected directly with the flask, after which the reaction was continued at 220° C.

When the distillation was completed, the flask was cooled, and by adding m-cresol the resulting resin was dissolved to obtain a resinous solution whose solids content was 50% by weight. The previously-described tests were conducted using the resulting resinous solution whose content of polyester solids was 50% by weight. The abbreviations used in the table have the following meanings.

DMN—dimethyl ester of naphthalenedicarboxylic acid.
DMT—dimethyl ester of terephthalic acid.
DMIT—dimethyl ester of isophthalic acid.
EG—ethylene glycol.
PG—propylene glycol.
THEIC—tris(2-hydroxyethyl)isocyanurate.

TABLE 1

| Number | Dicarboxylic acid component (A) (equivalent percent) | | | | | | | Alcohol component (B) | | | Properties | | |
|---|---|---|---|---|---|---|---|---|---|---|---|---|---|
| | 2.6-DMN | 2.7-DMN | 1.6-DMN | 1.5-DMN | 1.4-DMN | DMT | DMIT | THEIC[1] (equivalent percent) | EG[2] (mol percent) | PG[2] (mol percent) | Resistance to heat-softening (° C.) | Heat-resistant impact strength (° C.) | After heating windability (times) |
| Example 1 | 40 | | | | | | | 60 | | | 525 | 225 | 1 |
| Control 1 | 30 | | | | | | | 70 | | | 520 | 175 | 1 |
| Control 2 | | 40 | | | | | | 60 | | | 511 | 175 | 2 |
| Control 3 | | | 40 | | | | | 60 | | | (State of condensation poor; could not be withdrawn in a varnish state; so sample could not be prepared.) | | |
| Control 4 | | | | 40 | | | | 60 | | | 501 | (4) | (5) |
| Control 5 | | | | | 40 | | | 60 | | | 489 | (4) | (5) |
| Control 6 | | | | | | 40 | | 60 | | | 489 | 175 | 2 |
| Control 7 | | | | | | | 40 | 60 | | | 430 | 175 | 2 |
| Example 2 | 45 | | | | | | | 55 | | | 540 | 225 | 1 |
| Example 3 | 50 | | | | | | | 50 | | | 522 | 225 | 1 |
| Control 8 | 60 | | | | | | | 40 | | | 547 | 175 | 1 |
| Control 9 | | 50 | | | | | | 50 | | | 511 | 175 | 2 |
| Control 10 | | | 50 | | | | | 50 | | | (State of condensation poor; could not be withdrawn in a varnish state, so sample could not be prepared.) | | |
| Control 11 | | | | 50 | | | | 50 | | | 507 | (4) | (6) |
| Control 12 | | | | | 50 | | | 50 | | | 492 | (4) | (6) |
| Control 13 | | | | | | 50 | | 50 | | | 492 | 175 | 2 |
| Control 14 | | | | | | | 50 | 50 | | | 433 | 175 | 2 |
| Example 4 | 40 | | | | | | | (60) | 50 | | 517 | 200 | 1 |
| Control 15 | 30 | | | | | | | (70) | 50 | | 507 | 175 | |
| Example 5 | 45 | | | | | | | (55) | 50 | | 519 | 200 | 1 |
| Example 6 | 50 | | | | | | | (50) | 50 | | 514 | 200 | 1 |
| Control 16 | 60 | | | | | | | (40) | 50 | | 521 | 175 | 2 |
| Example 7 | 45 | | | | | | | (55) | 25 | | 519 | 225 | 1 |
| Control 17 | | 45 | | | | | | (55) | 25 | | 487 | (4) | (6) |
| Control 18 | | | 45 | | | | | (55) | 25 | | 487 | 175 | 1 |
| Control 19 | | | | | | 45 | | (55) | 25 | | 452 | 150 | 1 |
| Example 8 | 45 | | | | | | | (55) | | 25 | 511 | 200 | 1 |
| Control 20 | | 45 | | | | | | (55) | | 25 | 510 | 150 | 1 |
| Control 21 | | | 45 | | | | | (55) | | 25 | (State of condensation poor; not possible to obtain in varnish form.) | | |
| Control 22 | | | | | | 45 | | (55) | | 25 | 500 | (4) | (6) |
| Control 23 | 45 | | | | | | | | | [3] 55 | (Cannot be obtained as varnish by the same polymerization method.) | | |

[1] The figure in the parentheses indicates the equivalent percent of the total of THEIC and EG or PG contained in the polyester composition.
[2] Mol percent based on the total of THEIC and EG or PG.
[3] Equivalent percent contained in polyester component.
[4] No capacity for forming coating; comes off in a powdery state.
[5] No capacity for forming coating; measurement impossible.
[6] Measurement impossible.

TABLE 2

| Number | Dicarboxylic acid component (A) | | | | | | | Alcohol component (B) | | | Properties | | |
|---|---|---|---|---|---|---|---|---|---|---|---|---|---|
| | 2.6-DMN (equivalent percent) | 2.7-DMN (mol percent)* | 1.6-DMN (mol percent)* | 1.5-DMN (mol percent)* | 1.4-DMN (mol percent)* | DMT (mol percent)* | DMIT (mol percent)* | THEIC (equivalent percent) | EG** (mol percent) | PG** (mol percent) | Resistance to heat-softening (°C.) | Heat-resistant impact strength (°C.) | After-heating windability (times) |
| Example 9 | 45 | | 3 | 2 | | | | (55) | | | 520 | 225 | 1 |
| Example 10 | 45 | 5 | | | | | | (55) | | | 522 | 225 | 1 |
| Control 24 | 30 | | 8 | 8 | | | | (70) | | | (Solution become turbid; could not be obtained in varnish form, so sample could not be prepared.) | | |
| Example 11 | 47 | | 2 | | | | | (53) | 30 | | 498 | 200 | 1 |
| Control 25 | 47 | | 20 | | | | | (53) | 30 | | (State of condensation poor; could not be withdrawn in a varnish state; so sample could not be prepared.) | | |
| Example 12 | 43 | | | 3 | | | | (57) | | 30 | 462 | 200 | 1 |
| Control 26 | 43 | | | 20 | | | | (57) | | 30 | (State of condensation poor; could not be withdrawn in a varnish state; so sample could not be prepared.) | | |

*Mol percent on component (A).
**Mol percent based on the total of THEIC and EG or PG and the values in the parentheses of the THEIC column indicate in equivalent percent the content of said total in the polyester component.

We claim:
1. A coating-forming polyester consisting essentially of units derived from
   (A) an aromatic 2,6 - naphthalenedicarboxylic acid component consisting of a member selected from the group consisting of 2,6-naphthalene-dicarboxylic acid and the lower alkyl esters and halides thereof and 0–10 mol percent, based on said member, of other dicarboxylic acids or derivatives thereof selected from the group consisting of the aromatic dibasic acids other than 2,6 - naphthalenedicarboxylic acid, the lower alkyl esters and halides of said aromatic dibasic acids, and the aliphatic dibasic acids and the lower alkyl esters and halides thereof; and
   (B) an alcohol component consisting of tris(2-hydroxyethyl)isocyanurate and other di- or trihydric alcohols, the latter polyhydric alcohols being contained in an amount of 0–60 mol percent of the total of said isocyanurate and other polyhydric alcohols; with the proviso that said aromatic 2,6-naphthalenedicarboxylic acid component (A) accounts for 40–50 equivalent percent of the whole polyester.

2. A polyester according to claim 1 wherein said other dicarboxylic acid or derivative thereof is a member selected from the group consisting of naphthalenedicarboxylic acids other than 2,6-naphthalenedicarboxylic acid, terephthalic acid and isophthalic acid, and the $C_1$–$C_4$ alkyl esters and halides of said acids.

3. A polyester according to claim 1 wherein said other dicarboxylic acid or derivative thereof is a member selected from the group consisting of adipic, succinic, maleic and sebacic acids, and the $C_1$–$C_4$ alkyl esters and halides of said acids.

4. A polyester according to claim 1 wherein said other aliphatic alcohol component is a member selected from the group consisting of ethylene glycol and propylene glycol.

References Cited

UNITED STATES PATENTS

| 3,448,084 | 6/1969 | Burdick et al. | 260—75 |
| 3,342,780 | 9/1967 | Meyer et al. | 260—75 |

OTHER REFERENCES

Hill: "Fibres from Synthetic Polymers," Elsevier, New York, 1953, p. 156.

Hill et al.: J. Polym. Sci. 3, 620 and 623 (a1948).

MELVIN GOLDSTEIN, Primary Examiner

U.S. Cl. X.R.

117—230, 132 B; 260—33.4 P, 33.6 R